Nov. 15, 1927.  
H. A. MILLER  
1,649,361  
DRIVE MECHANISM FOR VEHICLES  
Filed Jan. 30, 1925  
3 Sheets-Sheet 1

Nov. 15, 1927.

H. A. MILLER 1,649,361

DRIVE MECHANISM FOR VEHICLES

Filed Jan. 30, 1925   3 Sheets-Sheet 2

Inventor:
Harry A. Miller,
By Hazard and Miller
Attorneys.

Witness:
Wm Hall

Nov. 15, 1927.  
H. A. MILLER  
1,649,361  
DRIVE MECHANISM FOR VEHICLES  
Filed Jan. 30, 1925  
3 Sheets-Sheet 3

Inventor:  
Harry A. Miller.  
By Hazard and Miller  
Attorneys.

Witness:  
Wm Hall.

Patented Nov. 15, 1927.

1,649,361

UNITED STATES PATENT OFFICE.

HARRY A. MILLER, OF LOS ANGELES, CALIFORNIA.

DRIVE MECHANISM FOR VEHICLES.

Application filed January 30, 1925. Serial No. 5,778.

This invention relates to improvements in drive mechanisms for vehicles.

It is an object of this invention to provide an improved driving mechanism for a vehicle, which shall essentially consist of a driving shaft, a driven shaft, a clutch connecting the driving shaft to the driven shaft, a pinion carried by the driven shaft, an axle, a first sleeve disposed about the axle and rotatable thereabout, a second sleeve rotatable about the first sleeve, a ring gear mounted upon the second sleeve and engaging the pinion so as to rotate the second sleeve, a counter-shaft driven by the second sleeve providing a speed change transmission operatively connecting the second sleeve to the first sleeve, and a differential which shall connect the first sleeve to the sections of the axle.

A further object of this invention is to provide an improved front wheel drive for vehicles which shall be compact and so arranged that the rotation of the counter-shaft of the speed change transmission shall be at a comparatively low speed as compared with the driving or driven shafts.

A still further object of this invention is to provide a means for causing the clutch mechanism of a vehicle to be held in disengaged position while the speed change transmission is in neutral position, so that the counter-shaft of the speed change transmission and various other elements in the improved drive mechanism for the vehicle shall be allowed to remain stationary when the vehicle is not moving but is having its motor running.

With the foregoing and other objects in view which will be made manifest in the following detailed description and pointed out in the appended claim, reference is had to the accompanying drawings for an illustrative embodiment of the invention, wherein:

Figure 1:
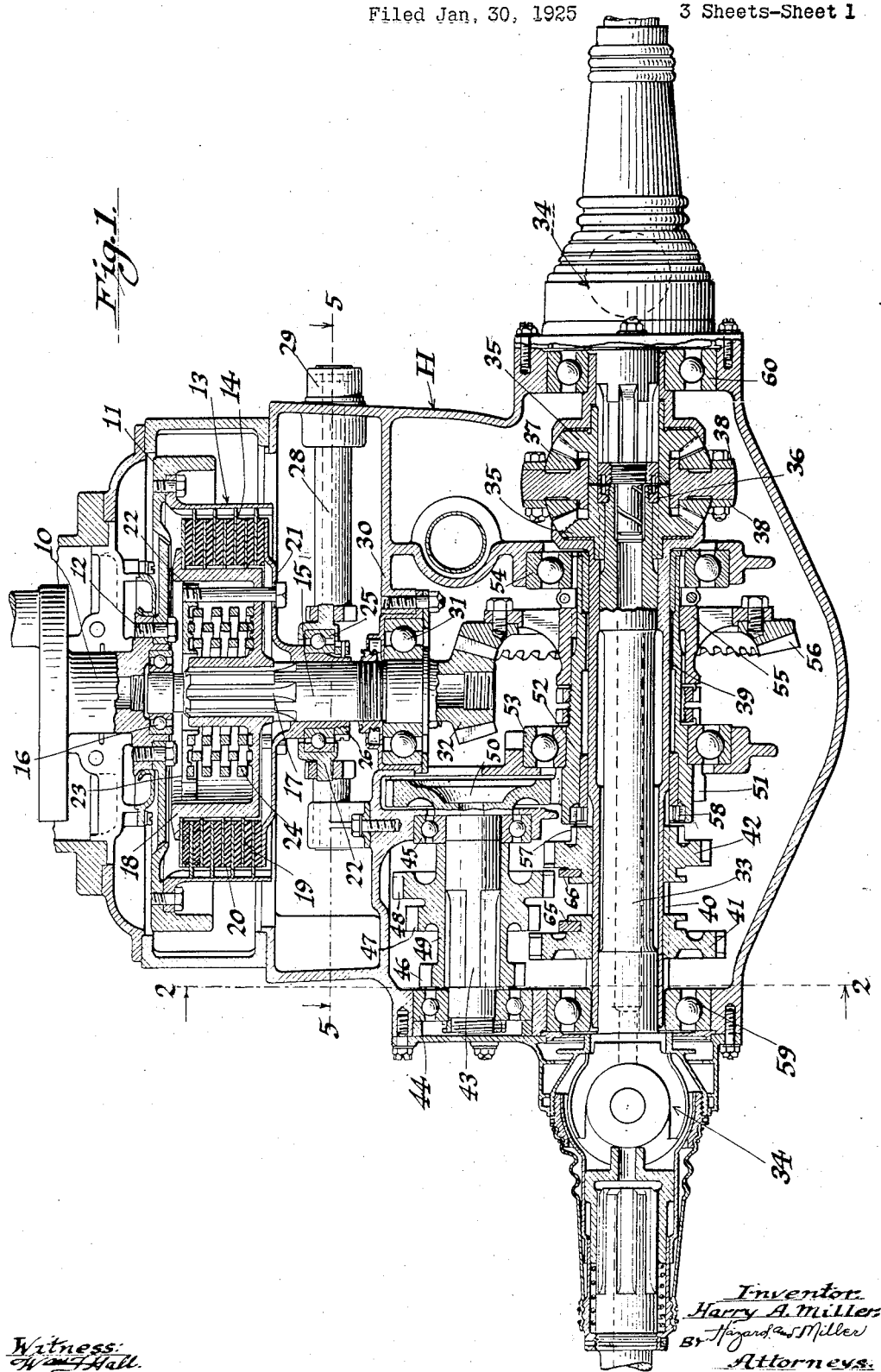
Figure 1 is a horizontal section through the improved driving mechanism.

Referring to the accompanying drawings wherein similar reference characters designate similar parts throughout, the improved vehicle driving mechanism consists of a driving shaft 10, which in this case constitutes the forward end of the crank shaft of the motor of the vehicle, it being understood that the improved drive is primarily intended to be the front wheel drive for a vehicle. The forward end of the drive or crank shaft 10 has a fly wheel 11 secured thereto as by means of bolts 12. Secured to the fly wheel 11 is a clutch drum 13 carrying plates 14. The driven shaft 15 has one end rotatably mounted in the forward end of the drive or crank shaft 10 by means of a roller bearing 16. The driven shaft 15 has a plurality of grooves 17 formed thereon and a clutch hub 18 is carried by the driven shaft 15 and is keyed thereto as by means of the shoulders provided by the grooves 17. The clutch hub 18 carries plates 19, and clutch discs 20 are disposed between the plates 19 and 14. A suitable plate 21 is mounted about the driven shaft 15 and is slidable longitudinally thereon. Suitable bolts 22 extend through the plate 21 and the clutch hub 18 and are secured to a suitable plate 23. A spring 24 is compressed between the plate 23 and the clutch hub 18 and normally urges the clutch into engaged position. The plate 21 provides a collar about the driven shaft 15 upon which there is secured a roller bearing 25 by means of a nut 26. A throw-out yoke 27 engages the roller bearing 25 and is adapted to be moved longitudinally with respect to the driven shaft 15 by means of a rod 28, which is rotated by means of a throw-out lever 29.

The above described clutch is of more or less conventional construction and it is to be understood that any suitable type of clutch mechanism may be substituted therefor. The driven shaft 15 extends into a housing, generally designated at H, and has its forward end journaled upon a rib 30 extending thereacross by means of a roller bearing 31. Upon the forward end of the driven shaft 15 is mounted a pinion gear 32. An axle 33 formed of two parts extends through the opposite sides of the housing H and is provided with suitable ball joints, generally designated at 34. The adjacent ends of the sections of the axle 33 are provided with differential gears 35 which are keyed to the sections of the axle and secured in place by means of nuts 36. Spider gears 37 mesh with the differential gears 35 and are journaled between the companion flanges 38 provided upon a sleeve 39 which is disposed about the axle 33 and rotatable thereabout. The differential gears 35 together with the spider gears 37 constitute a differential connecting the first sleeve 39 to the sections of the axle 33. One end of the sleeve 39 is provided with suitable ribs 40 upon which sliding gears 41 and 42 are keyed for longitudinal sliding movement.

A counter-shaft 43 has its ends journaled by means of suitable bearings 44 and 45 in the housing H and carries gears 46, 47 and 48 keyed thereto. If desired, the gears 46, 47 and 48 may be provided upon a common hub 49. The counter-shaft 43 carries a gear 50 which is in mesh with teeth 51 formed upon a second sleeve 52, which second sleeve is rotatable about the first sleeve 39. The second sleeve 52 has its ends journaled by means of bearings 53 and 54 and carries a suitable flange 55 rigidly keyed thereto, which flange carries a ring gear 56, meshing with the pinion gears 32.

The operation of the above described construction is as follows: As the drive or crank shaft 10 rotates, engagement of the clutch causes the driven shaft 15 to rotate therewith. The pinion gear 32 upon the driven shaft 15 rotates the ring gear 56 producing rotation of the second sleeve 52. The second sleeve 52 causes the counter-shaft 43 to be rotated. Upon sliding the sliding gear 41 toward the right so as to cause engagement with the gear 47, the drive mechanism will be placed in low gear. To shift into second or intermediate gears, the sliding gear 41 is disengaged from the gear 47 and the sliding gear 42 is caused to engage with the gear 48 upon the counter-shaft 43. The hub of the gear 42 is provided with suitable teeth 57, which are adapted to engage teeth 58 provided upon the interior of the second sleeve 52. To shift into high gear, the sliding gear 42 is disengaged from the gear 48 and the teeth 57 are caused to engage the teeth 58. In such position, the sleeve 52 causes the first sleeve 39 to rotate therewith. In other words, when the sliding gear 42 is shifted into high speed position, the second sleeve 52 is locked against rotation relative to the first sleeve 39. The first sleeve 39 being thus caused to rotate produces rotation of the companion flanges 38 so that the spider gears 37 will be caused to move about the axle 33 and the differential gear 35 will rotate the sections of the axle 33, permitting these sections to rotate relatively to each other, as in the case of the conventional differential axle construction. The ends of the first sleeve 59 may be journaled in roller bearings 39 and 60 provided upon the ends of the housing H.

A reverse gear 61 is rotatably mounted upon a suitable shaft 62 and meshes with the gear 46 upon the counter-shaft 43. When the sliding gear 42 is in the position shown in Fig. 1, the vehicle may be reversed by causing the sliding gear 41 to be moved toward the left, thereby engaging the reverse gear 61 driven by the gear 46.

Figure 2:
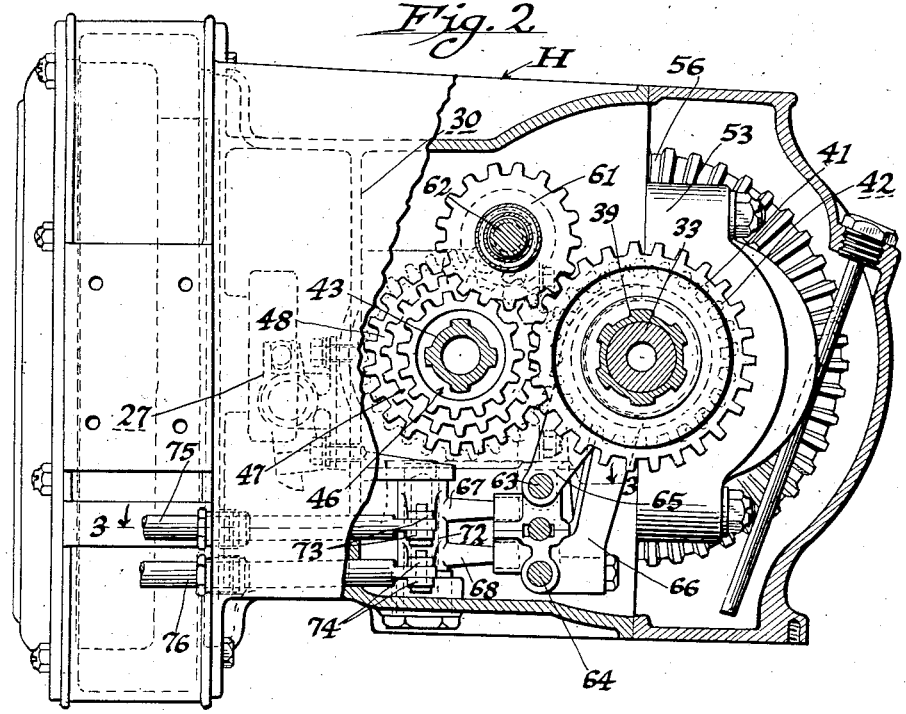
Fig. 2 is a vertical section taken substantially on the line 2—2 of Fig. 1.
Figure 3:
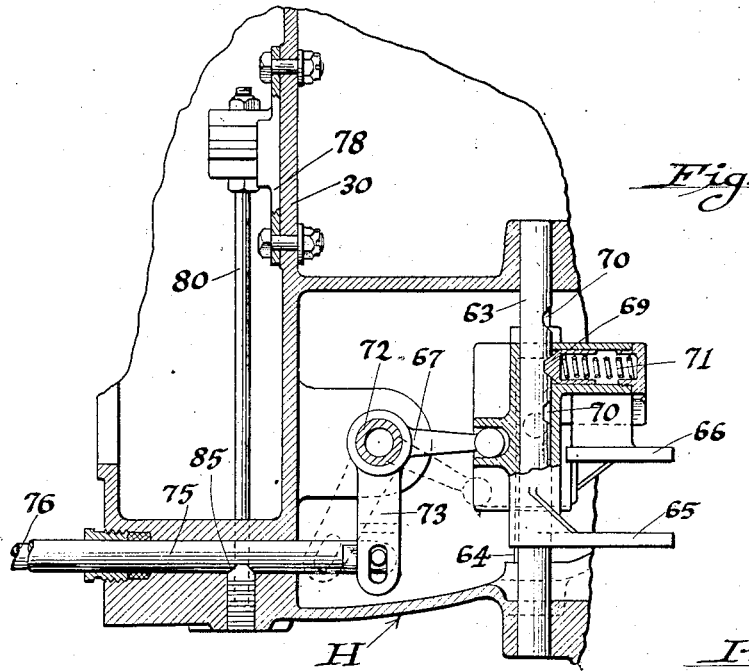
Fig. 3 is a horizontal section taken substantially on the line 3—3 of Fig. 2.
Figure 4:
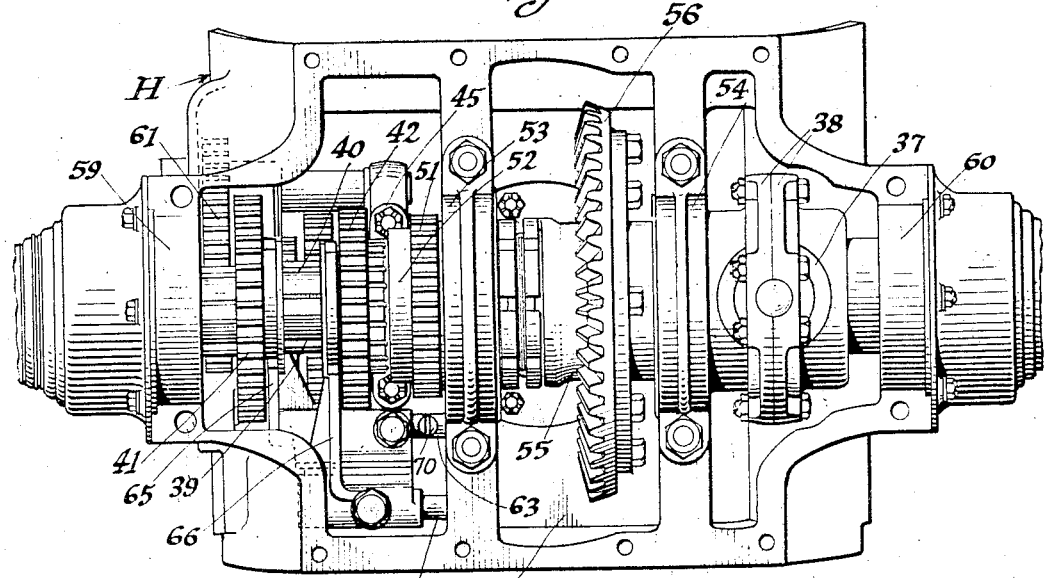
Fig. 4 is a front elevation of the drive mechanism, the forward wall of the housing having been removed.

As shown in Fig. 2, shafts 63 and 64 are provided within the housing H and shifter forks 65 and 66 are carried thereby, which shifter forks are adapted to slide upon the shafts 63 and 64 and shift or produce sliding movement of the sliding gears 41 and 42. The shifter forks are actuated by bell cranks 67 and 68 respectively. A locking mechanism for holding the shifter forks 65 and 66 in shifted position is shown in Fig. 3 consisting of a spring pressed member 69 which is pressed into engagement with notches 70 by means of a spring 71. The bell cranks 67 and 68 are rotatable about a vertical spindle 72 and have their arms 73 and 74 respectively connected to operating rods 75 and 76, which are adapted to be actuated by the gear shift lever mounted upon the vehicle.

As the counter-shaft 43 together with the second sleeve 52, the ring gear 56 and the driven shaft 15 all rotate when the speed change transmission is in neutral position, the rotation of these various elements might produce some noise upon becoming worn. Means is therefore provided for automatically holding the clutch in disengaged position when the speed change transmission is shifted from low, intermediate, high or reverse gears into neutral position.

Figure 5:
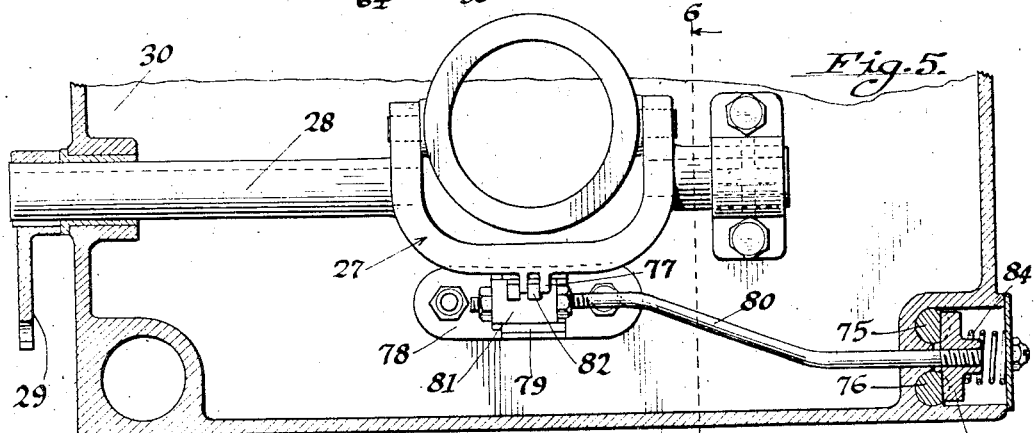
Fig. 5 is a vertical section taken substantially on the line 5—5 of Fig. 1.
Figure 6:
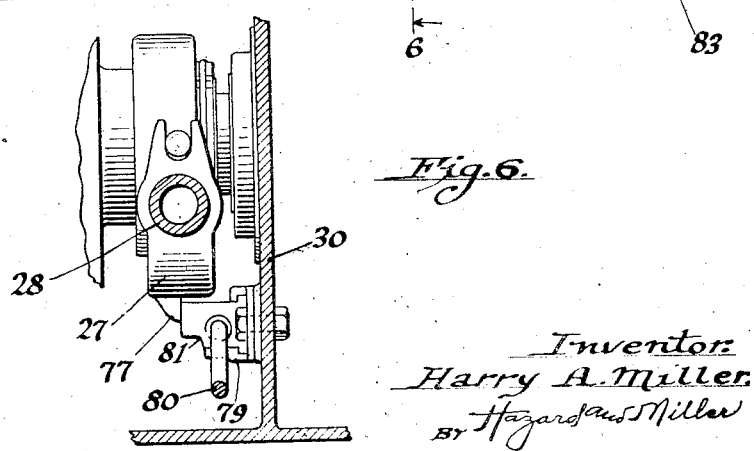
Fig. 6 is a view taken substantially on the line 6—6 of Fig. 5.

The throw-out yoke 27, as clearly shown in Fig. 5, is provided with one or more lugs 77 and upon a suitable support indicated at 78 there is mounted a guide 79. A rod 80 carries a suitable bushing 81 which is provided with notches 82. The notches 82 upon being placed in alignment with the lugs 77 carried upon the throw-out yoke 27 permit the clutch to become engaged. A wedge 83 is carried by the rod 80 and this wedge together with the rod 80 is urged into the position shown in Fig. 5 by means of a spring 84. As shown in Fig. 3, the rods 75 and 76 are provided with notches 85. When the speed change transmission is in neutral position, the notches 85 are disposed one above the other, and the wedge 83 may be disposed therein, being urged by the spring 84. When the wedge 83 is disposed within the notches 85, the rod 80 shifts the bushing so as to assume the position shown in Fig. 5. Upon removing the foot from the clutch throw-out pedal, which operates the clutch throw-out lever 29, the lugs 77 engage the body of the bushing 81 and prevent the clutch from becoming engaged. When the speed change transmission has been shifted into gear, the wedge 83 will be held out of the notches 85 and will accordingly shift the notches 82 to permit the lugs 77 to enter them and thus will allow the clutch to become engaged. As will readily be understood, holding the clutch out by causing the lug 77 to engage the body of the bushing 81 instead of entering the notches 82 will permit the crank or drive shaft 10 to rotate without causing rotation of the driven shaft 15, the pinion gear 32, the ring gear 56, the counter-shaft 43, or the second sleeve 52, when the sliding gears 41 or 42 are disengaged from the gears 47 or 48 or the reverse gear 61, in other words, neutral position.

Because of the relative sizes of the pinion gear 32 and the ring gear 56, the sleeve 52 rotates at a much lower speed than the driven shaft 15 or the drive or crank shaft 10. Consequently, because of the relative sizes of the second sleeve 52 and the teeth 51 formed thereon and the gear 50, the counter-shaft 43 rotates at a lower speed than the second sleeve 52, so that the counter-shaft 43 rotates very slowly as compared with the rotation of the driven shaft 15 or the drive or crank shaft 10. Because of the slow rotation of the counter shaft 43, it is possible to shift gears, that is, engage the sliding gears 41 and 42 without throwing out the clutch without a very great danger of stripping the gears. A clutch of some type is preferably employed and to prevent the noise produced by the rotation of the driven shaft 15, the pinion gear 32, the ring gear 56, the second sleeve 52 and the counter-shaft 43, a device as herein disclosed is preferably associated with the clutch so as to prevent rotation of these parts when the speed change transmission is in neutral position.

It will be understood that various changes in the detail of construction may be made without departing from the spirit or scope of the invention as defined by the appended claim.

I claim:

A driving mechanism for vehicles comprising a driving shaft and a driven shaft, means including a clutch for connecting said driving shaft to said driven shaft, an axle, a first sleeve rotatable about said axle, a second sleeve rotatable about said first sleeve, means for driving said second sleeve by said driven shaft, means including a speed change transmission for driving said first sleeve by said second sleeve, means including a differential for driving said axle by said first sleeve, and automatic means actuated by placing said speed change transmission in neutral position for holding said clutch in disengaged position.

In testimony whereof I have signed my name to this specification.

HARRY A. MILLER.